Patented Dec. 4, 1923.

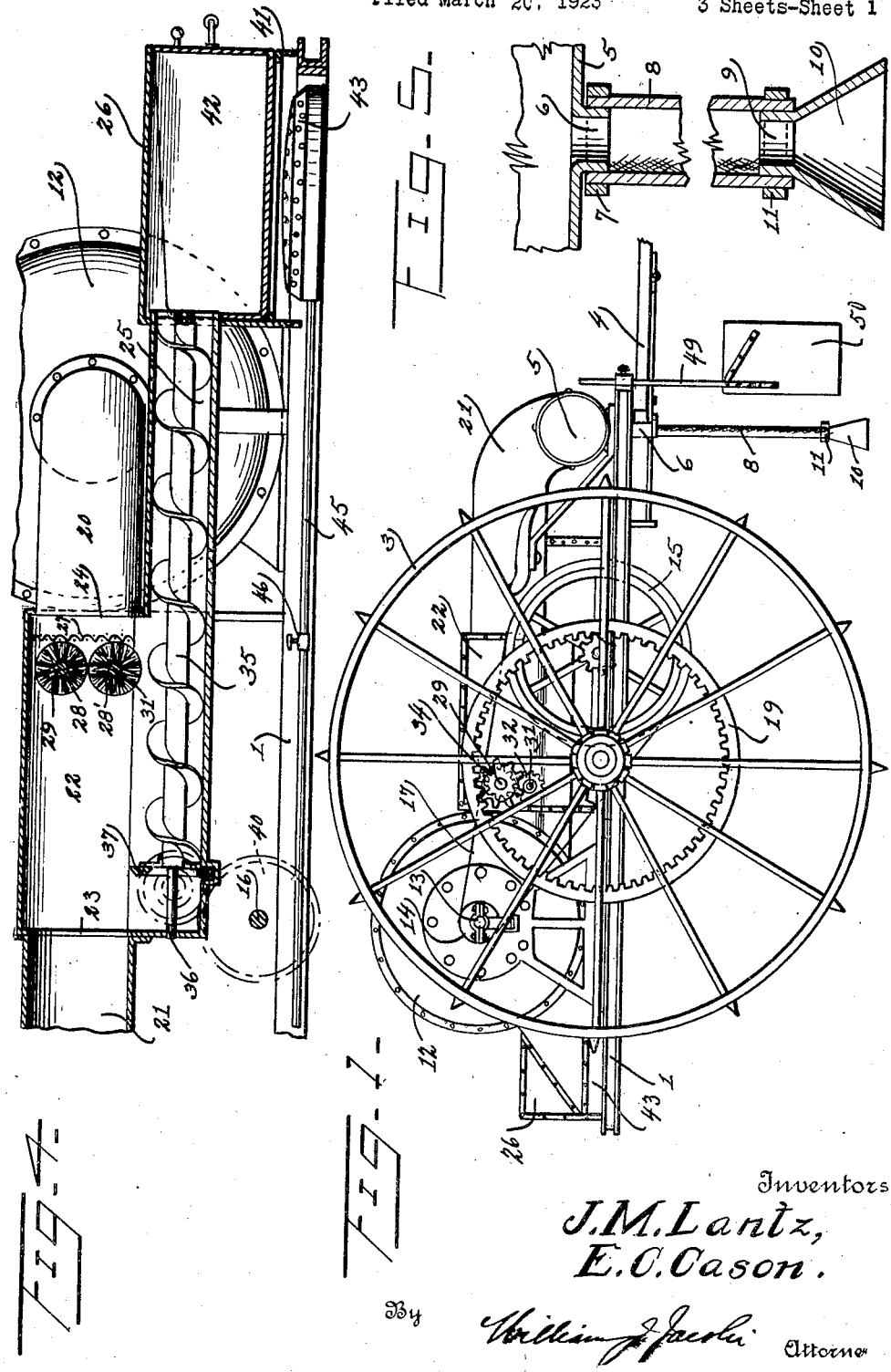

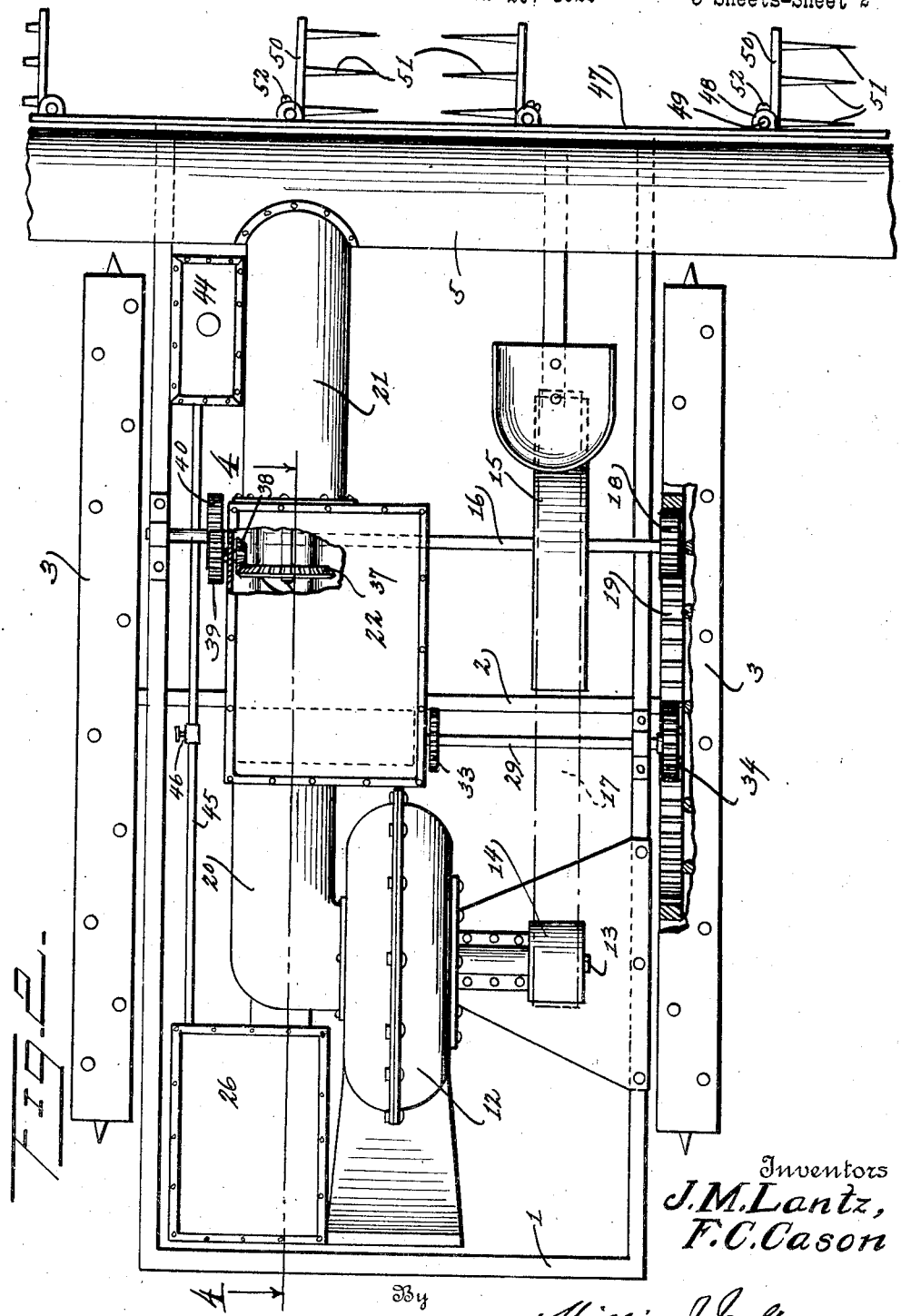

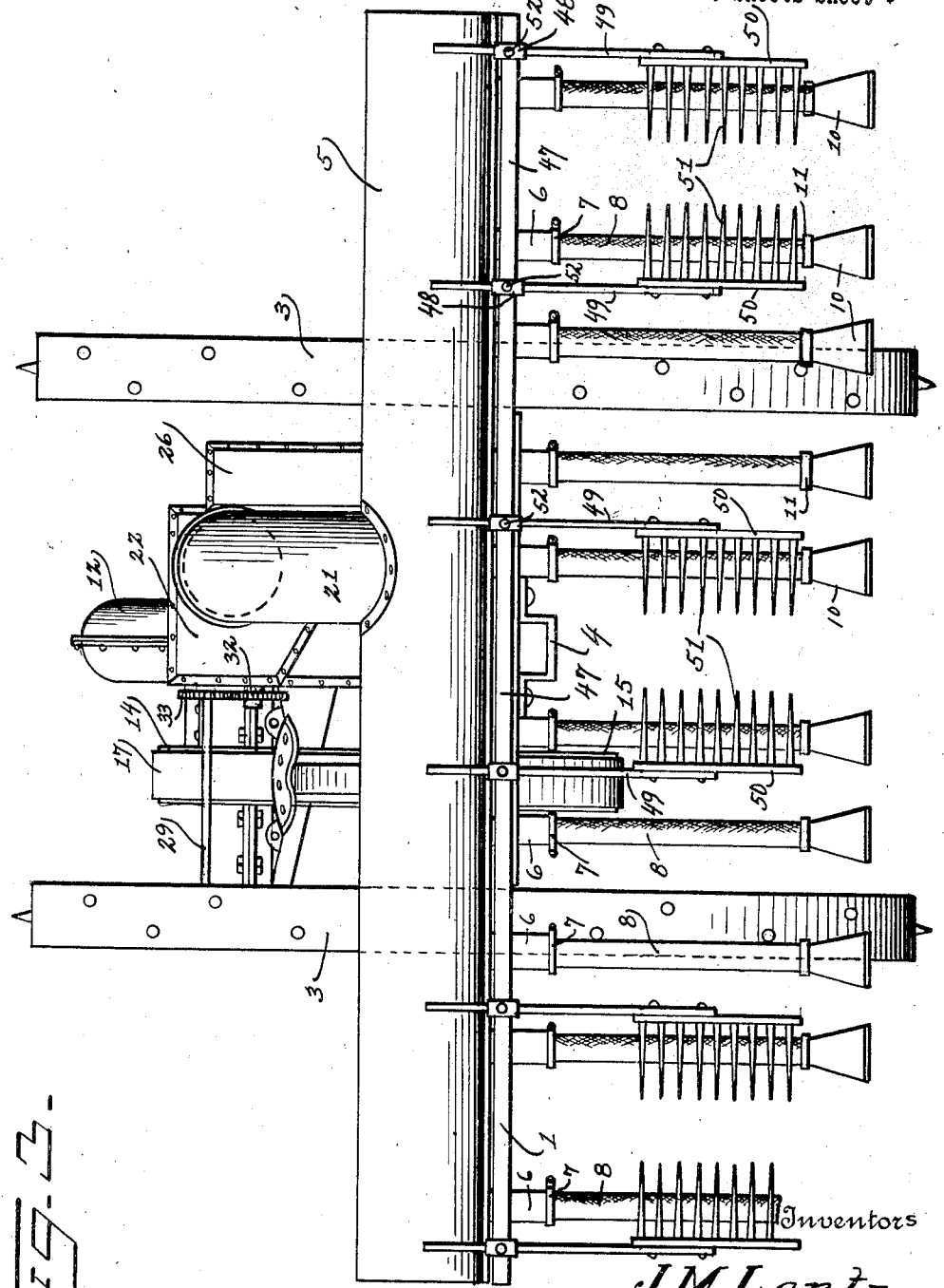

1,476,259

UNITED STATES PATENT OFFICE.

JAMES M. LANTZ AND EDWARD C. CASON, OF ALMA, ARKANSAS.

COTTON-BOLL-WEEVIL DESTROYER.

Application filed March 20, 1923. Serial No. 626,319.

*To all whom it may concern:*

Be it known that JAMES M. LANTZ and EDWARD C. CASON, citizens of the United States, residing at Alma, in the county of Crawford and State of Arkansas, have invented certain new and useful Improvements in Cotton-Boll-Weevil Destroyers, of which the following is a specification.

This invention relates to a cotton boll weevil destroyer and has for its principal object to provide a machine which is adapted to be propelled by draft animals, and equipped with a suction apparatus operated by the movement of the traction wheels of the machine to collect the cotton boll weevils and other insects from the growing plants and from the ground adjacent thereto.

Another important object of the invention is to provide a cotton boll weevil destroyer of the above mentioned character, which is provided with means for knocking the faulty squares off the growing plant onto the ground and having a suction device mounted upon the machine for collecting the boll weevils and faulty squares which have been knocked to the ground and furthermore provided with means for destroying the same.

A still further object of the invention is to provide a cotton boll weevil destroyer of the above mentioned character, which is provided with a heater for the purpose of exterminating and killing the boll weevils which have been collected by the suction apparatus mounted upon the machine.

A still further object of the invention is to provide a cotton boll weevil destroyer which is simple in construction, strong, durable and further well adapted for the purposes for which it is designed.

Other objects and advantages of this invention will become apparent during the course of the following description.

In the accompanying drawings forming a part of this specification and in which like numerals designate like parts throughout the same:—

Figure 1 is a side elevation of our cotton boll weevil destroyer.

Figure 2 is a top plan view thereof.

Figure 3 is a front elevation showing the arrangement of the suction chamber and suction tubes carried thereby and the arms carrying the extensions which are adapted to knock the boll weevils from the plants onto the ground.

Figure 4 is a vertical section taken on line 4—4 of Fig. 2 and looking in the direction of the arrows, and Figure 5 is a detail section of one of the suction tube structures.

In the drawings wherein for the purpose of illustration is shown the preferred embodiment of our invention, the numeral 1 designates the frame of our cotton boll weevil destroyer and carries the axle 2 which extends beyond the sides of the frame 1 and is adapted to receive the traction wheels 3 on its opposite end. The forward end of the frame 1 is connected to a suitable draft appliance 4 in order to permit the machine to be drawn over the ground by draft animals in an obvious manner.

The frame 1 may be made of any suitable material and in the present instance it is constructed of channel iron and is in the formation of a rectangular design as more clearly shown in the drawings. Mounted on the frame 1 and adjacent the forward end thereof is an elongated suction chamber 5 and this suction chamber 5 extends transversely towards the frame 1 may be secured thereon in any suitable manner. The bottom of the suction chamber 5 is provided with a plurality of spaced depending neck portions 6 as shown more clearly in Fig. 5 of the drawings. Adapted to be detachably secured upon and around the neck portion 6 are the flexible suction pipes 8. These suction pipes 8 which are detachably fitted around the neck portions 6 are made of any suitable material and preferebly rubber. The lower end of the rubber suction tubes 8 are secured to the upper portion 9 of the flared mouthpieces or funnels 10. These flared mouthpieces or funnels 10 may be formed of any suitable light metallic material and are held in the rubber suction tubes 8 by the clamping members 11.

The upper ends of the rubber suction tubes 8 are also provided with metallic sleeves 7 whereby the same may be clamped around the upper portion of the rubber suction tubes 8 for the purpose of detachably mounting the rubber suction tubes 8 upon the neck portions 6 which are carried by the suction chamber 5. The rubber suction tubes 8 may also have the flared mouthpieces formed of the same material as the body of the suction tube and we do not wish to confine ourselves to the manner in which the rubber suction tubes 8 are formed or secured to the suction chamber 5 and the flared mouthpieces 10.

Supported upon the frame 1 and adjacent the rear portion thereof is a fan casing 12. Journaled between the sides of the fan casing 12 is a shaft 13 which has mounted thereon for rotation therewith a suction fan. The shaft 13 projects through the casing at one side and has mounted on its projecting end a pulley wheel 14, while a larger pulley wheel 15 is mounted on the transverse shaft 16 in longitudinal alinement with the pulley wheel 14. A suitable belt 17 is mounted to travel over the pulley wheels 14 and 15 respectively and thereby cause the rotation of the shaft 13 and the suction fan mounted thereon within the casing 12 as the machine is drawing along the ground. It is to be understood however that the shaft 16 is journaled transversely on the frame 1 and has a cog wheel 18 provided at one end and meshing with the ring gear 19 carried by the spokes of the traction wheel 3 whereby the shaft 16 is caused to rotate when the machine is in operation. Any number of fans may be mounted upon the shaft 13 within the casing 12 for the purpose of facilitating the proper function in order to obtain the necessary results. Furthermore the fan may be rotated at a higher rate of speed by providing the shaft 13 on its extended end with a number of pulley wheels which are in turn connected with suitable pulley wheels mounted upon the shaft 16. The fan casing 12 is provided with an opening in the side wall thereof and the suction chamber 5 is also provided with a similar opening in the rear portion thereof. Adapted to extend forwardly of the fan casing 12 and fitted within the opening provided in the side wall thereof is the suction pipe 20. The suction chamber 5 is fitted in its opening with a rearwardly extending delivery pipe 21, the free ends of the pipes 20 and 21 respectively being arranged in longitudinal alinement and is spaced relation for the purpose hereinafter to be more fully described.

A suitable receptacle 22 is supported upon the frame 1 and is provided with registering openings 23 and 24 respectively in the upper side walls thereof for the purpose of receiving the free end of the pipes 20 and 21 respectively. The receptacle 22 is furthermore provided with a rearwardly extending portion 25 which provides a discharge pipe 25, the rear end of the discharge pipe 25 extending into the rear wall of the retort 26 for the purpose to be more fully described. As shown in Fig. 4 of the drawings, the forward portion of the receptacle 22 is in communication with the delivery pipe 21 and the rear portion thereof is in communication with the suction pipe 20. A suitable screen 27 is supported in the receptacle 22 adjacent the opening 24 provided therein and is adapted to surround the open end of the suction pipe 20 when in assembled relation.

The receptacle 22 is furthermore provided with a pair of oppositely rotating brushes 28 and 28' which are supported in the receptacle 22 on the transversely extending shafts 29 and 31. The shafts 29 and 31 extend outwardly of the receptacle 22 and carry the suitable cog wheels 32 and 33 respectively which mesh with each other, the cog wheel 33 extending above the cog wheel 32. On the end of the shaft 29 upon which the cog wheel 33 is mounted is the cog wheel 34 and this cog wheel 34 is adapted to mesh with the ring gear 19 heretofore mentioned whereby the brushes 28 and 28' will be caused to rotate. It is to be further understood that the brushes 28 and 28' are so arranged in the receptacle 22 as to be in close proximity to the screen 27.

Extending longitudinally in the lower portion of the receptacle 22 and in the discharge pipe 25 is the conveyor auger 35. The conveyor auger 35 is supported upon the shaft 36 which is journaled in the respective ends of the receptacle 22 and discharge pipe 25 and is provided with the bevel gear 37 which meshes with the bevel gear 38 supported upon a transversely extend-shaft upon the free end of which is mounted a cog wheel 39 which meshes with a cog wheel 40 mounted upon the transverse shaft 16 whereby the auger conveyor 35 may be rotated for the purposes to be more fully set forth in the following paragraphs.

The retort 26 which is mounted upon the frame 1 adjacent the rear portion thereof and also adjacent the fan casing 12 is provided with the apertured wall in the rear thereof for receiving and allowing the free end of the discharge pipe 25 to extend therethrough for the purpose to be hereinafter more fully described. This retort 26 has its bottom portion provided with a supporting flange 41 in the form of an annular ring and adapted to be supported upon the annular ring 41 and disposed within the retort 26 is the removable container 42. A suitable oil burner 43 is supported upon the frame 1 and is positioned directly underneath of the container 42. The oil burner 43 receives the fuel from an oil tank 44 mounted upon the forward end of the frame 1 and connected thereto by means of a suitable feed pipe 45. A valve or other suitable means designated by the numeral 46 in the drawings is provided with a feed pipe 45 for the purpose of regulating the amount of fuel being fed from the oil tank 44 to the burner 43.

A transversely extending bar 47 is secured to the front end of the frame 1 and carries the spaced brackets 48 which are adapted to act as guides for supporting the rods 49. These rods 49 carry at their lower ends the member 50 which is provided with the inwardly spaced fingers 51. These fingers 51 are preferably formed of rubber and are adapted to be arranged inwardly with respect to the adjacent member 50 to provide a means whereby the boll weevils or other insects may be easily knocked from the growing plants onto the ground and they are also mounted in close proximity to the suction tubes 8. For the purpose of adjusting the rods 49 vertically in order to obtain the proper height whereby the finger 51 may operate at the desired height of the plant for the purposes heretofore described I provide the set screws 52 in the bracket 48 for engagement with the vertical rods 49 for holding the same in any adjusted vertical position.

In operation, the machine is drawn over the growing plants in such a manner that the rubber suction tubes 8 and the rubber finger 51 when in their adjusted positions straddle the row of growing plants. As the boll weevil destroyer moves along the ground and over the growing plants, the inwardly extending rubber fingers 51 which are mounted upon the member 50 and are positioned directly forward of the suction chamber 5 and the suction tubes 8 carried thereby, they will come in contact with the growing plants and will knock all of the dead leaves and faulty squares from the plants onto the ground. The downwardly extending suction tubes 8 which are carried by the suction chamber 5 in the manner heretofore described will have their flared mouthpieces 10 in close proximity to the ground and as the machine moves along the ground the suction fan within the fan casing 12 will be caused to operate by means of the pulley wheel 14, the pulley wheel 15 and the belt 17 and thereby create a suction. The rubber suction tubes 8 will collect all of the boll weevils and other trash which has accumulated on the ground adjacent the plant and draw the same through the suction tubes 8 into the suction chamber 5. From there the trash, boll weevils and other foreign substances are drawn through the delivery pipe 21 into the receptacle 22 and the fan within the casing 12 will blow the refuse and boll weevils from the receptacle 22 into the discharge pipe 25 where the auger conveyor 35 will convey the refuse and boll weevils into the retort 26 and finally into the container 42 where the same due to the contact with the heater 43 will become heated and therefore burn up and extinguish all of the boll weevils and refuse. The brushes 28 and 28' which are mounted in the receptacle 22 will prevent the accumulation of the boll weevils and trash from entering into the pipe 20 and thereby prevent the proper operation of the suction fan, the screen 27 further preventing the trash from entering the pipe 20 hence preventing the proper operation of the suction fan within the casing 12.

Whenever it is necessary the container 42 may be removed from the retort 26 in order to remove the contents of the same and it is only necessary to remove this container after the boll weevil machine has been in use for a considerable length of time.

It will thus be seen from the foregoing description that a boll weevil destroying machine has been provided wherein the boll weevils and faulty squares are in the first instance knocked from the growing plants onto the ground and from there are collected by means of a suitable function apparatus and drawn through a suitable receptacle where the same is conveyed to a retort when in the last instance the boll weevils and other trash are burned and collected in a suitable receptacle.

The simplicity of this machine renders it very efficient in its operation and furthermore assures the extermination of the boll weevils as well as the faulty squares from the growing plants.

From the foregoing description of the construction of our improved apparatus, it will be seen that we have provided a simple, inexpensive and efficient means for carrying out the objects of the invention, and while we have particularly described the elements best adapted to perform the functions set forth, it is obvious that various changes in form, proportion and in the minor details of construction may be resorted to, without departing from the spirit or sacrificing any of the principles of the invention.

What we claim as new and desire to secure by Letters Patent is:—

1. In a machine of the character described including a frame, traction wheels on said frame, a suction chamber at the forward end of said frame, suction tubes communicating with and carried by said suction chamber, a fan casing in the rear of said frame, a suction fan therein, pipes extending from said fan casing and from said suction chamber, a container receiving the free ends of said pipe and interposed between said fan casing and said suction chamber, a discharge pipe extending from said receptacle, a retort on said frame and receiving said discharge pipe, a heater for said retort, a container removably mounted in said retort, and means for rotating said suction fan, and a conveyor extending longitudinally in the lower end of said receptacle and said discharge pipe.

2. In a machine of the character described including a frame, traction wheels on said frame, a suction chamber at the forward end of said frame, suction tubes communicating with and carried by said suction chamber, a fan casing in the rear of said frame, a suction fan in said fan casing, pipes extending from said suction fan casing and from said suction chamber, a receptacle disposed between said suction chamber and said fan casing and receiving the free ends of said pipes, said suction fan operated by the traction wheels on said frame, a discharge pipe extending from the lower end of said receptacle, a retort on said frame adjacent the rear thereof, and receiving said discharge pipe, a container removably mounted in said retort, a burner mounted on said frame and disposed beneath said container, a conveyor extending longitudinally through said receptacle and said discharge pipe, and means for operating the same.

3. In a machine of the character described, including a frame, traction wheels on said frame, a suction chamber at the forward end of said frame, suction tubes communicating with and carried by said suction chamber, a fan casing in the rear of said frame, a suction fan in said fan casing, pipes extending from said suction fan and from said suction chamber, a receptacle disposed between said suction chamber and said fan casing, and receiving the free ends of said pipes, said suction fan operated by the traction wheels on said frame, a discharge pipe extending from the lower end of said receptacle, a retort on said frame adjacent the rear thereof, and receiving said discharge pipe, a container removably mounted in said retort, a burner mounted on said frame and disposed beneath said container, a conveyor extending longitudinally through said receptacle and said discharge pipe, means for operating the same, and means on the front of said frame directly forward of said suction tubes for knocking the boll weevils from the growing plants onto the ground.

4. In a machine of the character described, including a frame, traction wheels on said frame, a suction chamber at the forward end of said frame, suction tubes communicating with and carried by said suction chamber, a fan casing in the rear of said frame, a suction fan in said fan casing, pipes extending from said suction fan casing and from said suction chamber, a receptacle disposed between said suction chamber and said fan casing and receiving the free ends of said pipes, said suction fan operated by the traction wheels on said frame, a discharge pipe extending from the lower end of said receptacle, a retort on said frame adjacent the rear thereof, and receiving said discharge pipe, a container removably mounted in said retort, a burner mounted on said frame and disposed beneath said container, a conveyor extending longitudinally through said receptacle and said discharge pipe, means for operating the same, and means on the front of said frame directly forward of said suction tubes for knocking the boll weevils from the growing plants onto the ground, said means being adjustably mounted and including inwardly disposed fingers.

In testimony whereof we affix our signatures.

JAMES M. LANTZ.
EDWARD C. CASON.